United States Patent
Schopp

(10) Patent No.: US 7,100,009 B2
(45) Date of Patent: Aug. 29, 2006

(54) METHOD AND SYSTEM FOR SELECTIVE MEMORY COALESCING ACROSS MEMORY HEAP BOUNDARIES

(75) Inventor: Joel H. Schopp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 10/666,794

(22) Filed: Sep. 18, 2003

(65) Prior Publication Data
US 2005/0066143 A1 Mar. 24, 2005

(51) Int. Cl.
G06F 12/00 (2006.01)
(52) U.S. Cl. .................... 711/163; 707/206
(58) Field of Classification Search .............. None
See application file for complete search history.

(56) References Cited

U.S. PATENT DOCUMENTS

| | | | |
|---|---|---|---|
| 5,680,582 A | 10/1997 | Slayden | |
| 6,175,900 B1 | 1/2001 | Forin et al. | |
| 6,412,053 B1 | 6/2002 | Bonola | |
| 6,453,403 B1 | 9/2002 | Czajkowski | |
| 6,526,422 B1* | 2/2003 | Flood et al. | 707/206 |
| 6,560,619 B1* | 5/2003 | Flood et al. | 707/206 |
| 6,823,351 B1* | 11/2004 | Flood et al. | 707/206 |
| 2004/0221120 A1* | 11/2004 | Abrashkevich et al. | 711/170 |
| 2005/0086195 A1* | 4/2005 | Tan et al. | 707/1 |
| 2005/0273567 A1* | 12/2005 | Blandy | 711/170 |
| 2006/0085433 A1* | 4/2006 | Bacon et al. | 707/100 |

* cited by examiner

Primary Examiner—Mano Padmanabhan
Assistant Examiner—Paul Baker
(74) Attorney, Agent, or Firm—Mark E. McBurney; Dillon & Yudell LLP

(57) ABSTRACT

A method and system for efficient coalescing of memory blocks across memory heap boundaries in multiprocessor or multithread computer system. Blocks of memory are allocated into multiple heaps for exclusive utilization by separate processors or processes. Varying memory requirements result in fragmentation and increased memory utilization over time and coalescing of memory is necessary. An identification of each memory heap which contains a preceding adjacent memory block and a succeeding adjacent memory block is maintained for all memory blocks. Thereafter, each time a memory block is freed it may be coalesced across heap boundaries with an adjacent preceding or succeeding memory block by temporarily locking access to only those memory heaps containing a free preceding or succeeding adjacent memory block.

15 Claims, 4 Drawing Sheets

| BLOCK NAME | CURRENT HEAP # | PRECEDING BLOCK HEAP # | SUCCEEDING BLOCK HEAP # |
|---|---|---|---|
| A | 30 | – | 30 |
| B | 30 | 30 | 30 |
| C | 30 | 30 | 32 |
| D | 32 | 30 | 34 |
| E | 34 | 32 | 34 |
| F | 34 | 34 | 36 |
| G | 36 | 34 | 36 |
| H | 36 | 36 | 36 |
| I | 36 | 36 | – |

Fig. 3

METHOD AND SYSTEM FOR SELECTIVE MEMORY COALESCING ACROSS MEMORY HEAP BOUNDARIES

BACKGROUND OF THE INVENTION

1. Technical Field

The present invention relates in general to improved computer systems and in particular to an improved method and system for managing allocated memory heaps. Still more particularly, the present invention relates to an improved method and system for effective coalescing of memory blocks across memory heap boundaries in a computer system.

2. Description of the Related Art

Many computer systems support the dynamic allocation of memory. Memory is typically dynamically allocated among multiple tasks or multiple processors. For example, a multi-tasking operating system may have a memory manager, which allocates memory to each of the tasks. Additionally, certain programming languages support memory management. A program may request that the memory manager allocate a block of memory of a given size. The memory manager then determines which block of memory to allocate to the requesting program and passes to the requesting program a pointer to the allocated block of memory within the system memory. That portion of the program can thereafter utilize that memory. When the program no longer requires that memory the program informs the memory manager that the block has been "freed." The memory manager typically de-allocates the block making it available to another processor or process. Memory designated for such use within a computer system is often referred to as "heap."

As blocks of memory are allocated and de-allocated to processors or threads within a computer system such heaps of memory often become fragmented. That is, blocks of free space occur between blocks of allocated space. While there may be enough free space to satisfy an allocation request from a processor or process, it may not be contiguous. Additionally, the more fragmented a memory heap becomes the longer it may take to obtain sufficient free space for a block to satisfy a particular allocation request from a processor or process within the system. Many memory managers therefore attempt to defragment or "defrag" the memory by compacting or coalescing the memory heaps. The goal of memory coalescing is therefore to move allocated blocks of memory together so as to merge the free space available into large blocks of memory rather than many small blocks of memory.

Prior art techniques for coalescing blocks of memory within multiple memory heaps typically do so within the boundaries of an individual memory heap. Attempts at coalescing memory across memory heap boundaries have typically required that access to all memory heaps be limited or locked so that memory may be freely allocated and de-allocated, copying existing data into newly freed memory blocks so that the memory may be utilized more efficiently. It should therefore be apparent that it would be desirable to provide a method and system whereby memory could be coalesced across memory heap boundaries without requiring that access to all memory heaps be temporarily suspended.

SUMMARY OF THE INVENTION

It is therefore one object of the present invention to provide an improved computer system.

It is another object of the present invention to provide an improved method and system for managing allocated memory heaps within a computer system.

It is yet another object of the present invention to provide an improved method and system for efficiently coalescing memory blocks across heap boundaries in a computer system.

The foregoing objects are achieved as is now described. A method and system are provided for efficient coalescing of memory blocks across memory heap boundaries in a multiprocessor or multithreaded computer system. Blocks of memory are allocated to multiple memory heaps to reduce serialization by increasing possible parallel access. Varying memory requirements result in fragmentation and increased memory usage over time and coalescing of memory is necessary. An identification of each memory heap which contains a preceding adjacent memory block and a succeeding adjacent memory block is maintained for every memory block allocated to a memory heap. Thereafter, each time a memory block is freed it may be efficiently coalesced across memory heap boundaries with an adjacent preceding or adjacent succeeding memory block by temporarily locking access to only those memory heaps containing such adjacent blocks.

BRIEF DESCRIPTION OF THE DRAWINGS

The novel features believed to be characteristic of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 3 is schematic representation of a memory block heap identification register which may be utilized to implement the method and system of the present invention.

DETAILED DESCRIPTION OF A PREFERRED EMBODIMENT

Figure 1:
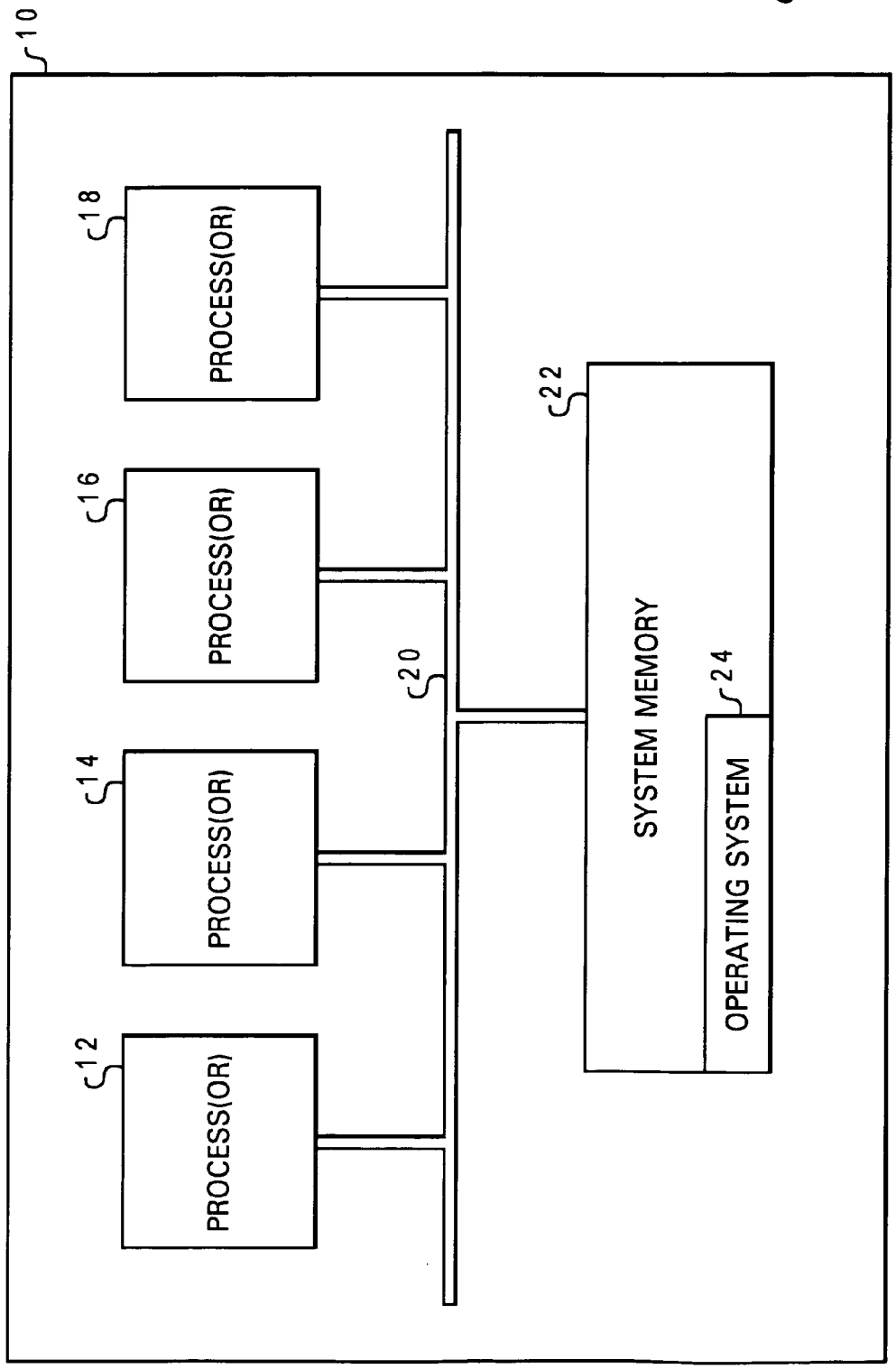
FIG. 1 is a high level block diagram of a computer system which may be utilized to implement the method and system of the present invention.

With reference now to the figures and in particular with reference to FIG. 1 there is depicted a high level block diagram of a computer system 10 which may be utilized to implement the method and system of the present invention. As illustrated, computer system 10 includes multiple processors or processes 12, 14, 16 and 18. Those having ordinary skill in the art will appreciate, upon reference to the present specification, that the method and system of the present invention may find application both in multiprocessor computer systems in which each processor requires allocated memory for performing its particular task or in so-called multithreaded or multitasking computer systems in which multiple processes are operating individually and require allocated memory to accomplish such processes.

As illustrated, each of the processors or processes within computer system 10 are coupled, via bus 20 to system memory 22. System memory 22 comprises a large store of memory, which may be utilized to store operating system 24, for example. Additionally, individual portions of system memory 22 are typically allocated in so-called "heaps" to each individual processor or process within computer system 10 for utilization by that processor or process in accomplishing its particular task.

Figure 2:
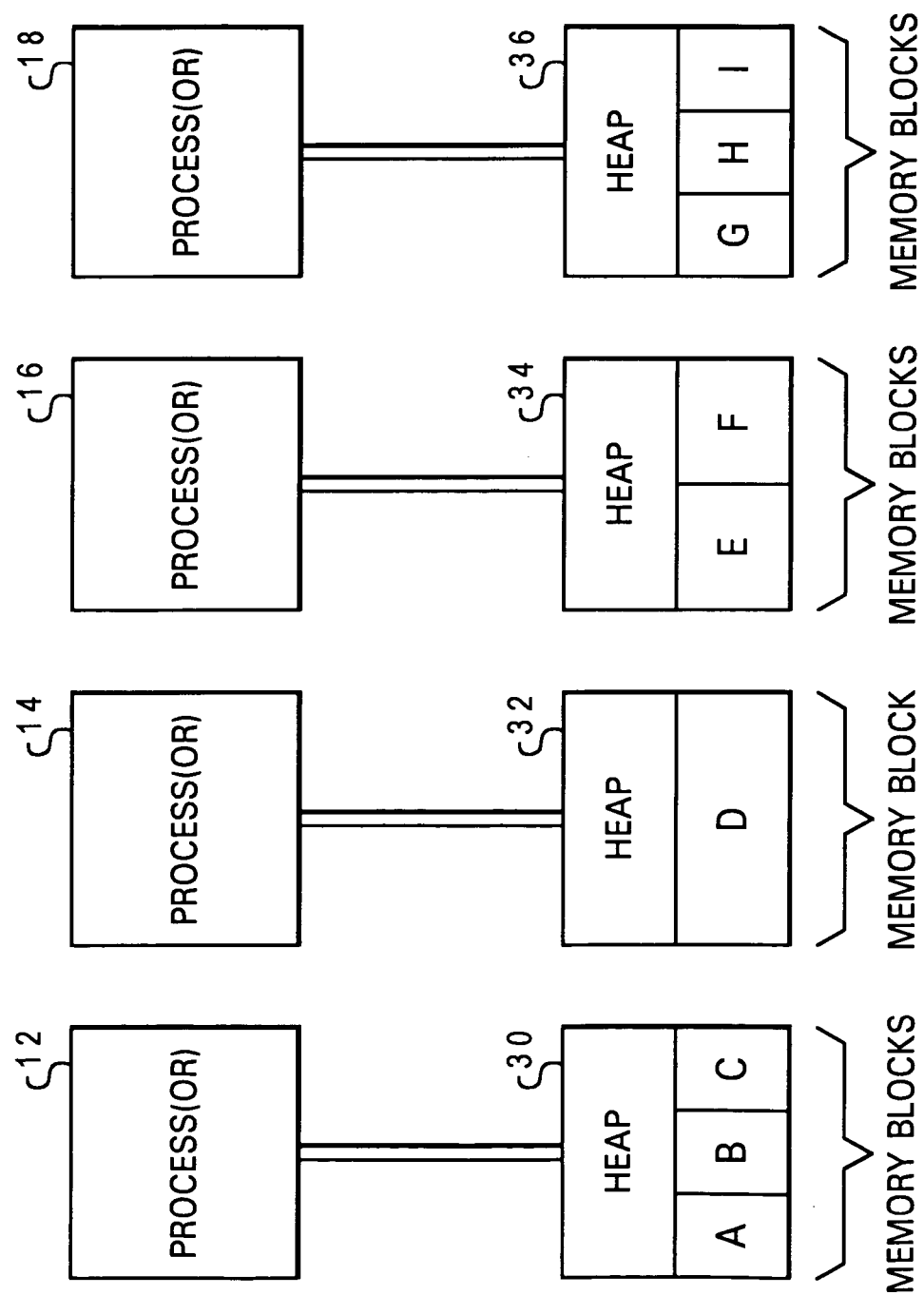
FIG. 2 a schematic representation of multiple allocated memory heaps which may be utilized in implementing the method and system of the present invention.

Referring now to FIG. 2, there is depicted a schematic representation of multiple allocated memory heaps which may be utilized in implementing the method and system of the present invention. As depicted above in FIG. 1, multiple processors or processes 12, 14, 16 and 18 are depicted. Each processor or process is then coupled to a memory heap. Thus, processor or process 12 is coupled to memory heap 30, as depicted in FIG. 2. Processor or process 14 is coupled to memory heap 32. Processor or process 16 is coupled to memory heap 34 and processor or process 18 is coupled to memory heap 36. Of course, those skilled in this art will appreciate that multiple processors may access the same memory heap, or that each processor may access multiple memory heaps.

As further depicted within FIG. 2, each memory head may contain one or more memory blocks which have been allocated to that memory heap by the memory allocator in response to requests from the processor or process involved. For purposes of illustration in the present application, memory heap 30 includes three memory blocks "A," "B," and "C." Memory heap 32 includes a single memory block "D." Memory heap 34 includes two memory blocks "E" and "F." Finally, memory heap 36 includes three memory blocks which are labeled "G," "H" and "I."

For purposes of illustration in the present application, each of the memory blocks has been designated by an alphabetic letter which is intended, for purposes of illustration only, to indicate the relative position of each memory block within system memory 22. Thus, for purposes of the present illustration, memory block "A" and memory block "B" are adjacent within system memory 22. Similarly, memory block "C" and memory block "D" are adjacent within system memory 22 as are memory blocks "F and G." Of course, those skilled in the art will appreciate that in actual operation adjacent memory block may or may not be assigned to a particular memory heap, dependent upon the order of allocation of those memory blocks to an individual processor or process.

Next, with reference to FIG. 3, there is depicted a schematic representation of memory block heap identification 26 which may be utilized to implement the method and system of the present invention. Each row within memory block heap identification 26 represents data which is stored within each specified memory block. As illustrated, each memory block is identified by name in the depicted example; however, those skilled in the art will appreciate that memory addresses are more typically utilized. Therefore, after each memory block's identification, three additional columns are present. The first column contains an identification of the memory heap containing that memory block. The second column contains an identification of the memory heap containing the preceding adjacent memory block to the block in question and finally, the last column contains an identification of the heap containing the succeeding adjacent memory block. Thus, block "A" is listed as being present within current heap number 30, having no preceding adjacent block and having its succeeding adjacent block ("B") present within heap 30.

Still referring to FIG. 3, memory block "D" for example, is listed as being present within memory heap 32 and its preceding adjacent memory block ("C"), is listed as being present within heap 30, while its succeeding adjacent memory block ("D") is listed as being within heap 34.

Upon reference to the foregoing, those skilled in the art will appreciate that by virtue of a simple memory entry the location of each block of memory allocated to a particular heap, an identification of that heap and an identification of the heap containing the preceding adjacent memory block within system memory and the succeeding adjacent memory block within system memory may be maintained. This small amount of additional overhead will, as illustrated herein, provide an efficient technique for coalescing memory blocks across heap boundaries.

Figure 4:
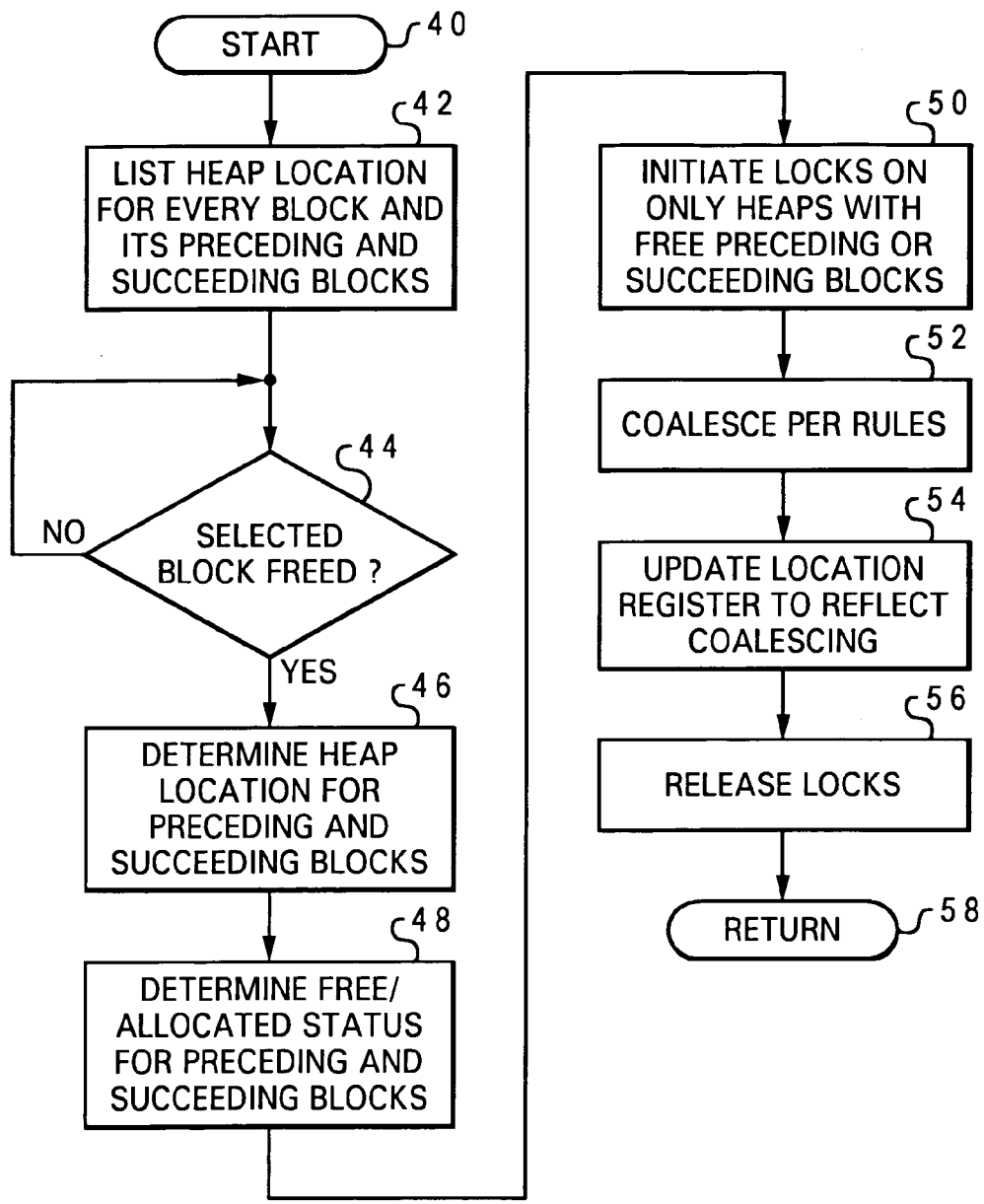
FIG. 4 is a high level logic flow chart which illustrates a process for implementing the method and system of the present invention.

Referring now to FIG. 4 there is depicted a high level logic flow chart which depicts a process for implementing a method and system of the present invention. As depicted, this process begins at block 40 and thereafter passes to block 42. Block 42 illustrates the listing of the heap location for every block of memory and its preceding and succeeding adjacent blocks of memory, as depicted within the FIG. 3. Next, the process passes to block 44.

Block 44 illustrates a determination of whether or not a particular memory block anywhere within the memory heaps depicted within the present system has been freed, or is no longer required. If not, the process merely iterates until such time as a block of memory has been released by the processor or process associated with that memory heap.

Still referring to block 44, in the event that a selected block of memory within a memory heap has been freed, the process passes to block 46. Block 46 illustrates a determination of the heap location for the preceding and succeeding adjacent blocks of memory for the block which has been freed. Thereafter, the process passes to block 48. Block 48 illustrates a determination of the free or allocated status of the preceding and succeeding adjacent blocks of memory associated with the selected block which has been freed. After determining the free or allocated status for both the free and succeeding block of memory, the process passes to block 50.

Referring now to block 50, the initiation of locks on only those heaps containing free preceding or succeeding adjacent blocks of memory is depicted. Thereafter, the process passed to block 52. Block 52 then illustrates a coalescing of memory blocks according to designated coalescing rules. Those having skill in the art will appreciate that various sets of rules may be provided for controlling the order and method of coalescing. For example, in accordance with one depicted embodiment of the present invention, these coalescing rules are suggested. Namely: (1) if both the preceding and succeeding adjacent blocks of memory are present within the same memory heap, the newly freed memory block is coalesced with both of those blocks and moved to the heap containing those two blocks; (2) if both the preceding and succeeding adjacent memory blocks are free but are present in two different heaps, the newly freed memory block is coalesced with the larger of the preceding and succeeding memory block in the heap which previously contained the newly freed memory block; and (3) if only one of the preceding or succeeding adjacent memory blocks is free, it should be coalesced with the newly freed memory block, thus providing a partial coalescing of two memory blocks. Of course, a situation in which multiple free adjacent blocks exist within the same memory heap is the degenerate case and is not addressed here.

Upon reference to the foregoing, those skilled in the art will appreciate that by utilizing this technique, access to a minimal number of memory heaps will be temporarily restricted to perform partial coalescing. Unlike prior art coalescing techniques wherein access to all memory heaps is restricted, the present method and system only partially coalesce memory; however, increased access to the remaining memory heaps is an advantageous result.

It should also be apparent to the foregoing description that, at a maximum, three memory heaps will require their access to be restricted via locks in a situation in which the current, preceding and succeeding memory block are all free and are each in a different memory heap. In a situation in which only one of the preceding and succeeding adjacent memory blocks is to be coalesced, and it is present within a different memory heap, access to two memory heaps will be restricted. In this manner the partial coalescing system of the present invention provides excellent scalability by limiting the number of locks applied to memory heaps to a maximum of three. Thus, for example, in a system having thirty-two processors or threads, the three locks required for partial coalescing, in accordance with the method and system of the present invention, would limit access to 9.4% of the memory heaps. In a computer system having sixty-four processors or processes, locking access to three memory heaps restricts access to only 4.7% of the memory heaps and thus, the method and system of the present invention finds greater and greater application in larger and larger computer systems.

Referring back to FIG. 4, in accordance with an important feature of the present invention, after coalescing a recently freed memory block with a free preceding adjacent or succeeding adjacent memory block and relocating one or both of those memory blocks to a different memory heap, the heap location indications which reflect the memory heap location of each block, its preceding block and its succeeding block must be updated so that the process can continue, as illustrated in block 54. Next, all locks are released, as depicted in block 56 then the process returns, as illustrated at block 58.

Upon reference to the foregoing, those skilled in the art will appreciate that the present application provides technique whereby small portions of memory within a large multiprocessor or multi-process computer system may be continually coalesced across heap boundaries while minimizing the limitation of access to the memory heaps for most other processors or processes in the system.

While the invention has been particularly shown and described with reference to a preferred embodiment, it will be understood by those skilled in the art that various changes in form and detail may be made therein without departing from the spirit and scope of the invention.

What is claimed is:

1. A method for selected memory coalescing across memory heap boundaries in a computer system having a plurality of allocated memory heaps, said method comprising the steps of:
   maintaining an identification of an allocated memory heap containing a preceding adjacent block of memory and an identification of an allocated memory heap containing a succeeding adjacent block of memory for each block of memory within said plurality of allocated memory heaps;
   determining a usage state of both a preceding adjacent block of memory and a succeeding adjacent block of memory in response to a freeing of a selected block of memory;
   temporarily locking access to only those allocated memory heaps containing a free preceding or a free succeeding adjacent block of memory for said selected block of memory;
   coalescing said selected block of memory with a free preceding adjacent block of memory and/or a free succeeding adjacent block of memory;
   updating said maintained identification of allocated memory heaps containing said preceding adjacent block of memory and said succeeding adjacent block of memory to reflect said coalescing; and
   releasing said temporarily locked access.

2. The method for selected memory coalescing according to claim 1 wherein said step of coalescing said selecting block of memory with a free preceding adjacent block of memory and/or a free succeeding adjacent block of memory comprises the step of coalescing said selected block of memory into a single allocated memory heap containing both a free preceding adjacent block of memory and a free succeeding adjacent block of memory.

3. The method for selected memory coalescing according to claim 1 wherein said step of coalescing said selecting block of memory with a free preceding adjacent block of memory and/or a free succeeding adjacent block of memory comprises the step of coalescing said selected block of memory with the larger of a free preceding adjacent block of memory and a free succeeding adjacent block of memory in response to a location of said free preceding adjacent block of memory and said free succeeding adjacent block of memory in two different allocated memory heaps.

4. The method for selected memory coalescing according to claim 1 wherein said computer system is a multiprocessor computer and wherein said method further includes the step of allocating a memory heap to each processor within said multiprocessor computer system.

5. The method for selected memory coalescing according to claim 1 wherein said computer system is a multithread computer system and wherein said method further includes the step of allocating a memory heap to each thread within said multithread computer system.

6. A system for selected memory coalescing across memory heap boundaries in a computer system having a plurality of allocated memory heaps, said system comprising:
   means for maintaining an identification of an allocated memory heap containing a preceding adjacent block of memory and an identification of an allocated memory heap containing a succeeding adjacent block of memory for each block of memory within said plurality of allocated memory heaps;
   means for determining a usage state of both a preceding adjacent block of memory and a succeeding adjacent block of memory in response to a freeing of a selected block of memory;
   means for temporarily locking access to only those allocated memory heaps containing a free preceding or a free succeeding adjacent block of memory for said selected block of memory;
   means for coalescing said selected block of memory with a free preceding adjacent block of memory and/or a free succeeding adjacent block of memory;
   means for updating said maintained identification of allocated memory heaps containing said preceding adjacent block of memory and said succeeding adjacent block of memory to reflect said coalescing; and
   means for releasing said temporarily locked access.

7. The system for selected memory coalescing according to claim 6 wherein said means for coalescing said selecting block of memory with a free preceding adjacent block of memory and/or a free succeeding adjacent block of memory comprises means for coalescing said selected block of memory into a single allocated memory heap containing both a free preceding adjacent block of memory and a free succeeding adjacent block of memory.

8. The system for selected memory coalescing according to claim 6 wherein said means for coalescing said selecting block of memory with a free preceding adjacent block of memory and/or a free succeeding adjacent block of memory comprises means for coalescing said selected block of memory with the larger of a free preceding adjacent block of memory and a free succeeding adjacent block of memory in response to a location of said free preceding adjacent block of memory and said free succeeding adjacent block of memory in two different allocated memory heaps.

9. The system for selected memory coalescing according to claim 6 wherein said computer system is a multiprocessor computer and wherein said system further includes means for allocating a memory heap to each processor within said multiprocessor computer system.

10. The system for selected memory coalescing according to claim 6 wherein said computer system is a multithread computer system and wherein said system further includes means for allocating a memory heap to each thread within said multithread computer system.

11. A computer program product for selected memory coalescing across memory heap boundaries in a computer system having a plurality of allocated memory heaps, said computer program product comprising:
 computer readable media;
 instruction means embodied within said computer readable media for maintaining an identification of an allocated memory heap containing a preceding adjacent block of memory and an identification of an allocated memory heap containing a succeeding adjacent block of memory for each block of memory within said plurality of allocated memory heaps;
 instruction means embodied within said computer readable media for determining a usage state of both a preceding adjacent block of memory and a succeeding adjacent block of memory in response to a freeing of a selected block of memory;
 instruction means embodied within said computer readable media for temporarily locking access to only those allocated memory heaps containing a free preceding or a free succeeding adjacent block of memory for said selected block of memory;
 instruction means embodied within said computer readable media for coalescing said selected block of memory with a free preceding adjacent block of memory and/or a free succeeding adjacent block of memory;
 instruction means embodied within said computer readable media for updating said maintained identification of allocated memory heaps containing said preceding adjacent block of memory and said succeeding adjacent block of memory to reflect said coalescing; and
 instructions means embodied within said computer readable media for releasing said temporarily locked access.

12. The computer program product for selected memory coalescing according to claim 11 wherein said instruction means for coalescing said selecting block of memory with a free preceding adjacent block of memory and/or a free succeeding adjacent block of memory comprises instruction means for coalescing said selected block of memory into a single allocated memory heap containing both a free preceding adjacent block of memory and a free succeeding adjacent block of memory.

13. The computer program product for selected memory coalescing according to claim 11 wherein said instruction means for coalescing said selecting block of memory with a free preceding adjacent block of memory and/or a free succeeding adjacent block of memory comprises the instruction means for coalescing said selected block of memory with the larger of a free preceding adjacent block of memory and a free succeeding adjacent block of memory in response to a location of said free preceding adjacent block of memory and said free succeeding adjacent block of memory in two different allocated memory heaps.

14. The computer program product for selected memory coalescing according to claim 11 wherein said computer system is a multiprocessor computer and wherein said computer program product further includes instruction means for allocating a memory heap to each processor within said multiprocessor computer system.

15. The computer program product for selected memory coalescing according to claim 11 wherein said computer system is a multithread computer system and wherein said computer program product further includes instruction means for allocating a memory heap to each thread within said multithread computer system.

* * * * *